United States Patent [19]
Bozik et al.

[11] 3,761,536
[45] Sept. 25, 1973

[54] PROCESS FOR COUPLING PROPYLENE AND ISOBUTYLENE

[75] Inventors: John E. Bozik, Plum Borough, Pa.; John A. Ondrey, Tyler, Tex.; Harold E. Swift, Gibsonia, Pa.

[73] Assignee: Gulf Research & Development Company, Pittsburgh, Pa.

[22] Filed: Dec. 16, 1971

[21] Appl. No.: 208,980

Related U.S. Application Data

[63] Continuation-in-part of Ser. No. 660,901, Aug. 16, 1967, abandoned, which is a continuation-in-part of Ser. No. 588,311, Oct. 21, 1966, abandoned.

[52] U.S. Cl........... 260/680 R, 260/666 A, 260/673
[51] Int. Cl............................................... C07c 3/20
[58] Field of Search..................................... 260/680

[56] References Cited
UNITED STATES PATENTS

| | | | |
|---|---|---|---|
| 3,476,747 | 11/1969 | Hargis et al...................... | 260/669 X |
| 3,631,216 | 12/1971 | Lipsig................................ | 260/680 |

FOREIGN PATENTS OR APPLICATIONS

| | | | |
|---|---|---|---|
| 950,686 | 2/1964 | Great Britain..................... | 260/604 |
| 951,513 | 3/1964 | Great Britain..................... | 260/604 |

*Primary Examiner*—Paul M. Coughlan, Jr.
*Attorney*—Meyer Neishloss et al.

[57] ABSTRACT

Propylene and isobutylene are oxydehydrodimerized at elevated temperatures in a continuous, non-cyclic process using a molar ratio of olefin to oxygen of about 1:2 to 2:1 in the presence of bismuth oxide.

6 Claims, No Drawings

PROCESS FOR COUPLING PROPYLENE AND ISOBUTYLENE

This application is a continuation-in-part of Ser. No. 660,901, filed Aug. 16, 1967, now abandoned, which is a continuation-in-part of Ser. No. 588,311, filed Oct. 21, 1966, now abandoned.

This invention relates to the dimerization of propylene and isobutylene at an elevated temperature in a continuous, noncyclic process using oxygen at a molar ratio of olefin to oxygen of about 1:2 to 2:1 in the presence of bismuth oxide as a catalyst or a catalyst mixture of bismuth oxide with selected metal oxides.

Propylene will dimerize at an elevated temperature in the absence of free oxygen by reaction with bismuth oxide to produce 1,5-hexadiene as the primary product and 1,3-cyclohexadiene and benzene as minor products. Isobutylene reacts in an equivalent manner. In this dehydrodimerizzation reaction, oxygen is extracted from the crystal lattice of the bismuth oxide, and bismuth metal is obtained as the final product. Bismuth oxide must be remanufactured from this bismuth metal for continued reaction. However, if the dehydrodimerization reaction is stopped when the bismuth oxide is only partly reduced and before the bismuth oxide crystal lattice has collapsed, the partly reduced bismuth oxide can be regenerated with free oxygen for reuse in the dehydrodimerization reaction. Both procedures involve a cyclic operation in which the desired dehydrodimerization reaction is carried out in the first step and the bismuth oxide oxidizer is regenerated in the second step.

We have discovered that the dehydrodimerization of propylene and isobutylene can be carried out in a straight-forward, non-cyclic, continuous reaction using bismuth oxide at elevated temperatures if sufficient free oxygen is present in admixture with the olefin during reaction. In this reaction the bismuth oxide functions as a catalyst. Since the bismuth oxide is present in the reactor in a fully oxidized state even after extended periods of use, it does not need to be regenerated. In this continuous reaction the free oxygen in the reaction gas supplies all of the oxygen which is required by the reaction. If sufficient free oxygen is not supplied for the reaction, some oxygen will be supplied by the bismuth oxide thereby necessitating regeneration of the bismuth oxide and resulting in cyclical operation. The amount of oxygen specified herein for the reaction is sufficient to insure continuous operation for long periods of time.

We have determined that a molar ratio of olefin to oxygen of about 1:2 to 2:1 is desirable in order to obtain the beneficial results of our invention. This ratio of olefin to oxygen can also be expressed as a volume ratio or a partial pressure ratio of olefin to oxygen of about 1:2 to 2:1. An inert gas can also be in admixture with the olefin and oxygen. Since the dehydrodimerization reaction is highly exothermic, the inert gas can effectively serve in part as a diluent and to control the rate of reaction and heat buildup in the system. Suitable inert gases include nitrogen, carbon dioxide, steam, the noble gases such as helium, less preferably a lower alkane such as methane, ethane, propane, the butanes, and the like. Atmospheric air is a suitable source of molecular oxygen and inert diluent. By inert is meant that the gas must be substantially non-reactive in the reaction environment. The inert diluent can effectively comprise up to about 90 volume percent of the total reaction gas mixture and preferably from about 50 to about 85 volume percent.

In the exothermic dehydrodimerization reaction the gases are premixed and are passed through a bed of the bismuth oxide catalyst. In a preferred procedure the reaction gas mixture of the olefin, the oxygen, and the inert gas, if any, are preheated to a temperature below the dehydrodimerization reaction temperature to avoid significant loss of olefin by direct oxidation prior to contact with the catalyst. In this preferred embodiment the catalyst bed is initially heated to reaction temperature and the cooler reaction gas is introduced into this hot catalyst bed whereupon the reaction gas mixture is heated to reaction temperature, and dimerization of the olefin begins. The exothermic heat of reaction can then be relied upon to maintain the reaction temperature.

Reaction to produce the desired dimers begins at about 475° C., particularly for the more reactive isobutylene, with an upper practical operating temperature of about 675° C. These specified operating or reaction temperatures refer to the maximum temperature within the catalyst bed, the hot-zone temperature, which is the hottest zone in the catalyst bed. The preferred reaction temperature range is about 525° C. to about 625° C. and the most preferred reaction temperature range is about 550° C. to about 600° C. The space time which is defined as the time that the olefin is in contact with the catalyst can desirably be within the range of about 5 seconds to about 45 seconds with a preferred range of about 15 seconds to about 30 seconds.

The reaction can be carried out at a pressure ranging from subatmospheric to several hundred p.s.i.g., however, a pressure of about atmospheric up to about 2 to 5 atmospheres is preferred to avoid the requirement of using pressure equipment capable of withstanding the elevated temperature involved in the reaction. As the pressure increases, the temperature required for equivalent reaction will decrease. When operating at atmospheric pressure, a partial pressure of olefin of between about 0.02 and 0.55 atmosphere is recommended with a partial pressure of between about 0.06 and 0.3 being preferred. At higher operating pressures the explosive limits of the mixture are avoided by use of a sufficient quantity of inert diluent gas.

The catalyst used herein is bismuth oxide. It can either be used unsupported in a granular form, or it can be supported on a suitable low surface area support. The surface area of the support can suitably be between about 0.05 and about one square meter per gram and preferably between about 0.08 and about 0.15 $M^2/g$. About 5 to about 30 percent bismuth oxide can be conveniently placed on the support by impregnating the support with a solution of a suitable bismuth compound such as bismuth nitrate in concentrated nitric acid, and drying and calcining the impregnated material. Suitable support materials having the desired low surface area including alumina, silicon carbide, zinc oxide, silica, silica-alumina, zirconium oxide, magnesium oxide, titanium oxides, mixtures of those and the like can be used.

The bismuth oxide can also be used in admixture with an inert solid such as silicon carbide as a solid diluent or with one or more metal oxides selected from an oxide of titanium, niobium, tantalum, zinc, silicon, aluminum, chromium, tungsten, zirconium, magnesium, calcium, iron, tin, lead, boron and other suitable metals from Groups II-A, III-A, IV-A, V-A, I-B, II-B, III-B, IV-B, VII-B, and VIII of the periodic table (as found on pages 392 and 393 of the HANDBOOK OF CHEMISTRY AND PHYSICS, 36th Edition, published by Chemical Rubber Publishing Co., Cleveland, Ohio.) A suitable decomposable salt of the metal can be used such as the carbonate, nitrate, hydroxide, acetate, and the like because it is converted to the oxide. The mixed oxide catalyst can be supported in the same manner as described for the bismuth oxide when used alone.

The admixture of metal oxide and bismuth oxide will catalyze the desired dimerization reaction of propylene or isobutylene, but the conversion, selectivity, and/or distribution of dimer products may be different with the mixed oxides than when bismuth oxide is used alone. The effect, if any, of the added metal oxide may be either a physical effect on the bismuth oxide, a catalytic effect or both. Molybdenum oxide is not a useful additive to bismuth oxide for dimerizing propylene or isobutylene. As stated, the bismuth oxide can be used alone or in admixture with the metal oxide or mixtures as described. The bismuth oxide can be used in admixture with up to about 95 weight percent of the other metal oxide or silicon carbide, preferably up to about 60 weight percent. Generally to obtain a significant effect at least about 5 weight percent of the other metal oxide is preferred.

In addition to catalyst formulation the conditions can affect the results include temperature, pressure, time of contact of the reactant gas with the catalyst, the mol ratio of olefin to oxygen, and the mol distribution of olefin, oxygen, and inert diluent gas in the reactant gas stream. The reaction conditions and their intercorrelation not only can affect the rate of the dimerization reaction but in addition can affect the relative proportions of the product dimers that are produced, the percent conversion of the olefin and the conversion efficiency, that is, the percent selectivity to the dimer mixture. The primary competing undesired reaction is the complete oxidation of the starting olefin and dimer products to carbon dioxide and water. Since unreacted olefin can readily be separated and recycled, the loss by combustion represents the prime process inefficiency.

As indicated, propylene is dimerized hereunder to produce a mixture of 1,5-hexadiene (diallyl), 1,3-cyclohexadiene and benzene. In similar manner isobutylene is dimerized to produce a mixture of 2,5-dimethyl-1,5-hexadiene; 1,4-dimethyl-1,3-cyclohexadiene and paraxylene. The greatest selectivity to 1,5-hexadiene, and 2,5-dimethyl-1,5-hexadiene is generally obtained when bismuth oxide alone, either in granular form or on a suitable support, it used. The silicon carbide and the defined metal oxides serve as a diluent for the bismuth oxide when used in admixture with the bismuth oxide. In addition, mixtures of bismuth oxide with certain of the metal oxides will result in a different conversion and selectivity in contrast with the bismuth oxide when used alone, such as an increase in the selectivity of the dimerization reaction to the cyclic and/or aromatic dimer products.

The following examples are set out to illustrate the novel process of the invention and to provide a better understanding of its details and advantages. The reactor and procedure are described in Example 3.

EXAMPLE 1

A bismuth oxide catalyst was prepared by dissolving $Bi(NO_3)_3 \cdot 5H_2O$ (Fisher reagent) in dilute nitric acid and then adding distilled water until the white hydrated bismuth oxide ceased to form. The precipitate washed several times with distilled water, filtered and oven dried at 120° C. for approximately two hours. The bismuth oxide was broken into 10–20 mesh particles and then calcined for 24 hours at 550° C. The resulting light yellow powder was ascertained to be $\alpha\text{-}Bi_2O_3$ by its X-ray diffraction pattern. The impurities were determined by spectrographic analysis to be sodium and aluminum in the 0.01 to 1.0 percent range and titanium, silica and calcium at less than 0.01 percent. The freshly prepared catalyst possessed a bulk density of 0.376 cc./g. and a surface area of 2.53 $M^2/g$. according to krypton adsorption.

EXAMPLE 2

A series of mixed metal oxides was also prepared by dissolving bismuth nitrate in dilute nitric acid, mixing a second metal oxide ($Nb_2O_5$, $Ta_2O_5$, $ZnO$, $WO_3$, and $TiO_2$) in the resulting solution and heating the mixture to dryness. The oxide mixture was then calcined at 500° C. for 20 hours. In each instance the atomic ratio of bismuth to the other metal was 2:1. In the prepartion of the mixed oxides and during the course of the reaction using these mixed oxides, complex metal oxide compound formation may take place. Such has been observed, for example, in the case of bismuth oxide-titanium dioxide mixtures by X-ray diffraction analysis.

EXAMPLE 3

A glass reactor 45 cm. in length and 7 mm. in internal diameter was used. A 6 cc. portion of the bismuth oxide catalyst as prepared in Example 1 was inserted to a depth of 18 cm. in the center section of the glass reactor on a quartz-wool support. The catalyst bed was heated by an externally mounted electric furnace to maintain a catalyst bed temperature of 575° C. throughout the reaction period. The reactant gases were premixed in a manifold containing an inert filler or packing material to give good mixing but were not preheated in order to reduce degradation to carbon dioxide.

A propylene-air-helium gas mixture was flowed through the reactor at the rate of 20 cc. of propylene, 50 cc. of air and 100 cc. of helium per minute for a period of about 1 hour. The effluent gases were passed in sequence through a wet ice-cooled trap to remove most of the water vapor, then through dry ice-acetone cooled traps to condense out the organic products, and finally through a bed of solid carbon dioxide absorbent. The condensed liquid product was analyzed by mass spectroscopy and gas chromatography. The results of this run and comparison runs utilizing other materials or combinations in place of the bismuth oxide as prepared in Example 2 are set forth in Table 1, in which conversion refers to the total propylene reacted and selectivity refers to the percent converted to $C_6$ hydrocarbons with the mol percent in the condensed organic liquid of the desired products being indicated. All runs were carried out at identical conditions.

The primary undesired by-products of this process are carbon dioxide and water resulting from the total combustion of some of the propylene or other hydrocarbon types. The major constituents of the condensed organic liquid not reported in Table 1 are water and propylene. Very small amounts of several of the follow-

TABLE 1

| Run No. | Catalyst | Percent Conv. | Select. | Diallyl | Benzene | 1,3-cyclo-hexadiene |
|---|---|---|---|---|---|---|
| 1 | $Bi_2O_3$ | 28.5 | 72 | 79.3 | 7.7 | 5.1 |
| 2 | $TiO_2$ | 3.2 | 0 | 0 | 0 | 0 |
| 3 | $Nb_2O_5$ | 2.4 | 0 | 0 | 0 | 0 |
| 4 | $Bi_2O_3\text{-}TiO_2$ | 22 | 73 | 52.6 | 24.0 | 14.5 |
| 5 | $2Bi_2O_3\text{-}Nb_2O_5$ | 26 | 68 | 41.4 | 40.7 | 13.2 |
| 6 | $2Bi_2O_3\text{-}Ta_2O_5$ | 30 | 70 | 49.5 | 32.7 | 10.6 |
| 7 | $Bi_2O_3\text{-}ZnO$ | 30.3 | 60 | 22.1 | 67.3 | 7.0 |
| 8 | $Bi_2O_3\text{-}WO_3$ | 14.4 | 36 | 16.9 | 55.3 | 13.9 | ing organic compounds were identified in different samples of the condensed organic liquid: acrylic acid, propionic acid, propylene oxide, acetaldehyde, acetic acid, toluene, phenol, styrene, ethyl benzene and propyl benzene. The occurrence of a slight quantity of propyl benzene in the product indicated that a very small amount of trimerization was taking place and the occurrence of styrene and ethyl benzene suggests that some of the propyl benzene was being cracked. Also analysis of the effluent propylene gas indicated that almost no conversion to propane, ethane, ethylene, methane, or hydrogen was taking place.

Table 1 clearly shows that the best yield of diallyl occurs with the bismuth oxide used alone and that benzene occurs in greater yields with the mixed oxide catalysts. This indicates that catalyst selection is one technique for varying the product spectrum. Also it is seen that neither titanium dioxide nor niobium oxide is catalytically active for hydrocarbon production when used alone. The 1,3-cyclohexadiene can be readily dehydrogenated to benzene, if desired, over a conventional dehydrogenation catalyst such as chromia on alumia.

EXAMPLE 4

The effect on conversion, selectivity and per pass yield resulting from variations in catalyst composition are further indicated in Table 2 in which a series of bismuth oxide and titanium dioxide catalyst systems were studied. These data were obtained at a reaction temperature of 575° C., a propylene flow of 20 cc. per minute, air flow of 50 cc. per minute, helium flow of 100 cc. per minute, and propylene and oxygen partial pressures of 0.12 and 0.06 atmosphere at atmospheric pressure:

TABLE 2

| Catalyst | Conversion | Selectivity | Yield, $C_6$ |
|---|---|---|---|
| $Bi_2O_3$ | 28.5 % | 72 % | 20.5 % |
| $Bi_2O_3\text{-}TiO_2$ | 22.0 | 73 | 16.1 |
| $Bi_2O_3\text{-}2TiO_2$ | 22.0 | 74 | 16.3 |
| $TiO_2$ | 3.2 | 0 | 0 |

We have discovered that the desired dimerization reaction will take place using a mixed or supported catalyst when the bismuth is present in an amount as low as one mol percent provided that the bismuth oxide is well distributed over the other metal oxide.

EXAMPLE 5

The relationship of temperature with oxygen consumption, conversion, selectivity, and mol percent of diallyl, benzene, and 1,3-cyclohexadiene in the condensate was determined using the flow rates and partial pressures of Example 3 and a bismuth oxide-titanium dioxide catalyst (atomic ratio, Bi/Ti = 1):

TABLE 3

| T. °C. | $O_2$ [a] | Percent Conv. | Select. | $C_6H_{10}$ | $C_6H_6$ | $C_6H_8$ |
|---|---|---|---|---|---|---|
| 25 | 4.8 | 0 | | | | |
| 475 | 3.5 | 2.1 | 0 | | | |
| 500 | 2.7 | 4.6 | 50 | Not analyzed | | |
| 525 | 1.7 | 12.2 | 67 | 76.5 | 11.5 | 12.0 |
| 550 | 0.1 | 17.7 | 74 | 67.5 | 20.5 | 12.0 |
| 575 | 0.0 | 22.0 | 74 | 58.5 | 27.5 | 14.0 |
| 600 | 0.0 | 26.1 | 72 | 53.0 | 33.5 | 13.5 |
| 625 | 0.0 | 25.6 | 70 | 46.0 | 41.5 | 12.5 |
| 650 | 0.0 | 25.4 | 67 | 47.4 | 41.6 | 11.0 |

[a] = Mol percent oxygen in effluent gas.

According to these data, there is 100 percent conversion at 575° C. based on oxygen. At higher temperatures more of the propylene is converted but this is associated with a decrease in selectivity. Of striking significance with regard to overall process objectives is the temperature dependence of the relative yields of diallyl and benzene. It has been discovered that higher temperatures consistently increase the benzene to diallyl yield ratio.

EXAMPLE 6

A propylene-air-helium mixture was flowed through a bismuth oxide-titanium dioxide mixture (atomic ratio, Bi/Ti = 1) at 575° C. and at atmospheric pressure. The partial pressure of propylene in the gas mixture was 49 mm. and that of oxygen was 68 mm. for a molar ratio of olefin to oxygen of 0.72. This reaction resulted in a conversion of 31.3 percent and a selectivity of 52.5 percent to six carbon compounds.

EXAMPLE 7

The conversion as a function of contact time, that is, the ratio of the amount of catalyst used to the feed rate of the propylene, was evaluated utilizing a bismuth oxide-titanium dioxide catalyst (atmoic ratio, Bi/Ti = 1) at 575° C. and atmospheric pressure and a propylene flow rate of 20 cc. per minute, an air flow rate of 50 cc. per minute, and a helium flow rate of 100 cc. per minute in which the partial pressure of propylene and oxygen was 0.12 and 0.06 atmosphere, respectively. The results are set forth in Table 4.

TABLE 4

| Ratio of Catalyst[a] to Propylene | Total Conversion | Selectivity |
|---|---|---|
| 2.3 | 0.2 % | 0.0 % |
| 5 | 3.24 | 68.1 |
| 7.6 | 16.1 | 73 |
| 10.2 | 20.2 | 73 |
| 12.4 | 23.4 | 72 |
| 15.4 | 25.3 | 71 |
| 17.8 | 25.8 | 71 |
| 20.0 | 26.4 | 71 |

[a] grams of catalyst per mol of propylene per hour × $10^4$.

Thus it is observed that the reaction requires at least a minimum amount of catalyst to obtain significant conversion. This is believed to result in part from the fact that a certain amount of ctalyst is required to heat the cool gas to reaction temperature. Furthermore, the conversion levels off quickly, apparently a result of complete usage of the oxygen at 575° C. as indicated in Table 3.

Whether in the presence or absence of oxygen, the dimerization of propylene to diallyl at any given temperature, if feasible, is thermodynamically less favorable than the reaction to benzene. Therefore, when diallyl is the preferred product, catalyst selection and operating conditions are carefully correlated, consistent with the teachings herein, to ensure the greatest yield of the desired product at economical conditions of operation. In this instance the benzene and 1,3-cyclohexadiene are regarded as by-products, albeit valuable. If the conversion is carried out at conditions which do not exhaust all free oxygen, effluent gas quencying may be desirable to forestall degradation to carbon dioxide in the effluent gas.

The condensed liquid product may be separated by fractionation into its components, including a benzene-1,3-cyclohexadiene fraction. These two may be separated by fractional crystallization, or alternatively, the 1,3-cyclohexadiene in this fraction may be directly converted to benzene in the presence of a dehydrogenation catalyst. When benzene is the desired end product, the diallyl by-product can readily be converted to benzene in a separate reaction by passing vaporized diallyl over a suitable dhydrocyclization catalyst.

EXAMPLE 8

Isobutylene was mixed with air and helium and passed through a bismuth oxide catalyst at a temperature of 575° C. and atmospheric pressure at the rate of 20 cc. of isobutylene, 50 cc. of air and 100 cc. of helium per minute for about 1 hour. Overheating and reduction of the catalyst to metallic bismuth resulted. The amount of catalyst was then reduced from 6 cc. to two cc. and the temperature reduced from 575° C. to 500° C., the other conditions remaining unchanged. The reaction was successful at this reduced contact time and lower temperature resulting in a total conversion of 30.4 percent with 58 percent selectivity to unsaturated $C_8$ hydrocarbons, of which 95 percent went to 2,5-dimethyl-1,5-hexadiene as the major product and p-xylene as the minor product.

EXAMPLE 9

A propylene-air mixture having a propylene to oxygen molar ratio of 2:1 was passed over 6 cc. of bismuth oxide (about 20 weight percent) on silicon carbide having a surface area of 0.25 $M^2/g$. (Type CMM from The Carborundum Company) for 2 hours. The reaction temperature was 550° C. and the gas hourly space velocity was 200 based on the propylene. There was an overall conversion of 11.7 percent with a selectivity of 66 percent to six carbon hydrocarbons with 1,5-hexadiene predominating.

EXAMPLE 10

Example 9 was repeated at a reaction temperature of 600° C. There was an overall conversion of 19.1 percent at a selectivity of 68 percent to six carbon hydrocarbons with 1,5-hexadiene predominating.

The conditions of reaction including temperature, partial pressures, and catalyst contact time are preferably carefully intercorrelated and adjusted to the catalyst and to the specific olefin or olefin mixture undergoing reaction in order to obtain optimum yield of the desired products and a minimum degradation to carbon dioxide and water. Although air is preferred as the source of oxygen due to convenience and cost, other sources of oxygen including pure oxygen can be used. A diluent gas is generally preferred for optimum results. Overall yields may be increased by the injection of a portion of the oxygen, either pure or diluted, into an appropriate portion of the catalyst bed as the reaction is taking place.

Once the oxydehydrogenative reaction has been initiated, it may be necessary to control overheating resulting from the exothermic nature of the reaction. For example, the reactor may be cooled externally by suitable means. Alternatively, cooling coils or the like may be distributed through the catalyst bed for temperature control. Also, control may be enhanced by reducing the density distribution of the active portion of the catalyst by admixture with silicon carbide, alpha-alumina or equivalent material. The supplemental addition of oxygen and/or diluent gas into the catalyst bed can be utilized to perform the additional function of supplementing temperature control.

It is to be understood that the above disclosure is by way of specific example and that numerous modifications and variations are available to those of ordinary skill in the art without departing from the true spirit and scope of our invention.

We claim:

1. The method of coupling propylene or isobutylene to produce 1,5-hexadiene or 2,5-dimethyl-1,5-hexadiene which comprises contacting propylene or isobutylene, molecular oxygen at a molar ratio of said olefin to free oxygen of about 1:2 to 2:1 and a catalyst consisting essentially of bismuth oxide at a temperature between about 475° C. and about 675° C., and recovering 1,5-hexadiene or 2,5-dimethyl-1,5-hexadiene.

2. The method in accordance with claim 1 in which the olefin is propylene and the product is 1,5-hexadiene.

3. The method in accordance with claim 1 in which the olefin is isobutylene and the product is 2,5-dimethyl-1,5-hexadiene.

4. The method in accordance with claim 1 in which the temperature is between about 525° C. and about 625° C.

5. The method in accordance with claim 1 in which the catalyst is on a support having a surface area of between about 0.05 and about 1 $M^2/g$.

6. The method in accordance with claim 1 in which the temperature is between about 550° C. and 600° C.

* * * * *